United States Patent
Hashimoto et al.

(10) Patent No.: US 10,834,662 B2
(45) Date of Patent: Nov. 10, 2020

(54) COMMUNICATION SYSTEM, PORTABLE TERMINAL, AND MOBILITY MANAGEMENT DEVICE

(71) Applicant: KDDI CORPORATION, Tokyo (JP)

(72) Inventors: Takeshi Hashimoto, Fujimino (JP); Takuro Sakai, Fujimino (JP); Yujin Noishiki, Tokyo (JP); Jun Takada, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 101 days.

(21) Appl. No.: 16/140,167

(22) Filed: Sep. 24, 2018

(65) Prior Publication Data

US 2019/0028957 A1    Jan. 24, 2019

Related U.S. Application Data

(63) Continuation of application No. PCT/JP2017/010929, filed on Mar. 17, 2017.

(30) Foreign Application Priority Data

Mar. 29, 2016 (JP) .................. 2016-065516

(51) Int. Cl.
*H04W 48/04* (2009.01)
*H04W 8/12* (2009.01)
(Continued)

(52) U.S. Cl.
CPC .......... *H04W 48/04* (2013.01); *H04M 15/00* (2013.01); *H04W 4/24* (2013.01); *H04W 8/04* (2013.01);
(Continued)

(58) Field of Classification Search
CPC ....... H04W 48/04; H04W 48/18; H04W 8/12; H04W 8/06; H04W 8/04; H04W 88/16
See application file for complete search history.

(56) References Cited

U.S. PATENT DOCUMENTS 8,804,520 B2    8/2014  Cortes Gomez
10,708,827 B2*  7/2020  Toth ................. H04W 64/003
(Continued)

FOREIGN PATENT DOCUMENTS

| JP | 2012-525746 A | 10/2012 |
|---|---|---|
| WO | 2015057723 A1 | 4/2015 |
| WO | 2016034199 A1 | 3/2016 |

OTHER PUBLICATIONS

EPO; Application No. 17774445.5; Extended European Search Report dated Jan. 7, 2019.

(Continued)

*Primary Examiner* — Min Jung
(74) *Attorney, Agent, or Firm* — Fitch, Even, Tabin & Flannery LLP

(57) ABSTRACT

A communication system is provided which includes: a portable terminal; a mobility management device that manages mobility of the portable terminal; a first gateway that connects the portable terminal to a first network; and a second gateway that connects the portable terminal to a second network. Based on a result of determining whether to connect the portable terminal to the first network via the first gateway or connect the portable terminal to the second network via the second gateway, the mobility management device switches between causing the portable terminal to use first contract information for connection to the first network via the first gateway and causing the portable terminal to use second contract information for connection to the second network via the second gateway.

8 Claims, 12 Drawing Sheets

(51) Int. Cl.
*H04W 88/16* (2009.01)
*H04M 15/00* (2006.01)
*H04W 8/06* (2009.01)
*H04W 4/24* (2018.01)
*H04W 76/25* (2018.01)
*H04W 76/15* (2018.01)
*H04W 76/11* (2018.01)
*H04W 8/04* (2009.01)
*H04W 48/18* (2009.01)
*H04W 60/00* (2009.01)

(52) U.S. Cl.
CPC ............... *H04W 8/06* (2013.01); *H04W 8/12* (2013.01); *H04W 48/18* (2013.01); *H04W 76/11* (2018.02); *H04W 76/15* (2018.02); *H04W 76/25* (2018.02); *H04W 88/16* (2013.01); *H04W 60/00* (2013.01)

(56) References Cited

U.S. PATENT DOCUMENTS

| | | | |
|---|---|---|---|
| 2012/0039323 | A1 | 2/2012 | Hirano et al. |
| 2012/0099578 | A1 | 4/2012 | Aramoto et al. |
| 2012/0147834 | A1 | 6/2012 | Zisimopoulos et al. |
| 2013/0070775 | A1 | 3/2013 | Qu |
| 2014/0119340 | A1 | 5/2014 | Stojanovski et al. |
| 2015/0146532 | A1* | 5/2015 | Stojanovski ............ H04W 8/02 370/235 |
| 2016/0088461 | A1* | 3/2016 | Jiang ...................... H04W 8/12 455/432.1 |
| 2016/0157150 | A1* | 6/2016 | Wirtanen ............. H04W 48/16 455/434 |
| 2016/0323926 | A1* | 11/2016 | Gao ...................... H04W 76/10 |
| 2017/0064666 | A1* | 3/2017 | Zhang .................. H04W 64/00 |
| 2018/0007591 | A1* | 1/2018 | Xu ..................... H04W 36/0055 |
| 2019/0261227 | A1* | 8/2019 | Guo ...................... H04W 60/04 |

OTHER PUBLICATIONS

"Local IP access principles for single PDN connection solutions," China Mobile, 3GPP TSG-SA2 Meeting #73, May 11, 2009, XP050346823.

"APN resolution for VoLTE," Ericsson, ST-Ericsson, Nokia Siemens Networks, May 11, 2011, pp. 1-3, Agenda Item: 6.4.

JPO; Application No. 2018-509050; Japanese Office Action dated Aug. 13, 2019.

Japan Patent Office, International application No. PCT/JP2017/010929, International Search Report dated May 25, 2017.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23. 401, V13.6.0, Mar. 24, 2016.

"3rd Generation Partnership Project; Technical Specification Group Services and System Aspects; Study on Architecture for Next Generation System" (Release 14) 3GPP TR 23.799, V0.3.0, Mar. 2016.

"3rd Generation Partnership Project; Technical Specification Group Services and System Aspects; General Packet Radio Service (GPRS) enhancements for Evolved Universal Terrestrial Radio Access Network (E-UTRAN)access (Release 13)" 3GPP TS 23.401, V13.6.1, Mar. 24, 2016.

\* cited by examiner

COMMUNICATION SYSTEM, PORTABLE TERMINAL, AND MOBILITY MANAGEMENT DEVICE

This application is a continuation of International Patent Application No. PCT/JP2017/010929 filed on Mar. 17, 2017, and claims priority to Japanese Patent Application No. 2016-065516 filed on Mar. 29, 2016, the entire content of both of which is incorporated herein by reference.

TECHNICAL FIELD

The present invention relates to a communication system, a portable terminal, and a mobility management device.

BACKGROUND ART

A fourth-generation mobile communication system (4G) includes an access network implemented using a radio communication technology, such as LTE (Long Term Evolution), and a core network called EPC (Evolved Packet Core), for example. Such a mobile communication system is operated by various operators. To enable communication via the mobile communication system, a user of each portable terminal subscribes with one of the operators. Hereinafter, the operator with which the user of the portable terminal subscribes for this portable terminal is referred to as a home operator. For example, Non-Patent Literature 1 (NPTL 1) discloses a roaming technology that allows a user to use the same portable terminal even when the user moves to a region or country different from the region or country in which the home operator of the user provides a service. Hereinafter, an operator that provides a service via the mobile communication system in the region or country different from the region or country in which the home operator provides the service is referred to as a local operator or a roaming operator, A study on a technology of a fifth-generation mobile communication system (5G) is proceeding. Non-Patent Literature 2 (NPTL2) discloses a 5G roaming technology used in a similar manner as in the EPC.

CITATION LIST

Patent Literature

NPTL1: 3GPP TS23.401 (V 13.6.0), "General Packet Radio Service (GPRS) enhancements for Evolved Universal Terrestrial Radio Access Network (E-UTRAN) access"
NPTL2: 3GPP TS23.799 (V0.3.0), "Study on Architecture for Next Generation System"

SUMMARY OF INVENTION

Technical Problem

To connect a portable terminal (UE) to, for example, the Internet using the EPC, a communication channel is established between the portable terminal and a base station eNB (Evolved Node B) and a PGW (Packet Data Network Gateway). Then, data communication is performed via this established communication channel. In the case of 5G, the PGW in the EPC is divided into a C-Plane (control signal) function and a U-Plane (data transfer) function, Moreover, an MME in the EPC corresponds to an MM (Mobility Management) function and an SM (Session Management) function in 5G. As a first method to use a portable terminal overseas, a home route method (hereinafter, referred to as the home method) is known. The home method uses the eNB and the MME managed by the local operator as well as an HSS (Home Subscriber Server) and the PGW managed by the home operator.

The use of the HSS managed by the home operator allows authentication to be performed accurately. A communication fee is calculated based on the number of paCkets that passed through the PGW. Here, with the home method, the communication fee is calculated based on the number of packets that passed through the PGW managed by the home operator. Thus, accurate charging can be made. However, the home method requires the data packets to be captured from a network of the local operator into a network of the home operator via a relay network called IPX (IP exchange). This results in data latency.

As a second method to use the portable terminal overseas, a local breakout method (hereinafter, referred to as the local method) is known. The local method uses not only the eNB and MME of the local operator, but also the PGW thereof. Since the PGW of the local operator is used in the local method, this means that the local operator generates charging information. Thus, even though the user subscribes to the home operator, the home operator cannot obtain reliable charging information.

To solve the above problem, the user may insert, into the portable terminal, a SIM (Subscriber Identity Module) card obtained when the user subscribes to the local operator to use the portable terminal overseas. However, when using the SIM card of the local operator, the user cannot use the phone number obtained when subscribing to the home operator.

Furthermore, it is anticipated that services to be provided by 5G or the like include not only broadband communication but also services that require instantaneousness (lose latency) on the millisecond scale, such as VR (Virtual Reality), AR (Augment Reality), and Tactile Internet. Even with the same operator, when data transfers are performed by way of a specific PGW included in a center device, latency may occur in a service with a low latency requirement. This cannot meet the required condition of the service.

Solution to Problem

According to an aspect of the present invention, a communication system is provided which includes: a portable terminal; a mobility management device that manages mobility of the portable terminal; a first gateway that connects the portable terminal to a first network; and a second gateway that connects the portable terminal to a second network. Based on a result of determining whether to connect the portable terminal to the first network via the first gateway or connect the portable terminal to the second network via the second gateway, the mobility management device switches between causing the portable terminal to use first contract information for connection to the first network via the first gateway and causing the portable terminal to use second contract fo a for connection to the second network via the second gateway.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

First Embodiment

Overview of Communication System

Figure 1:
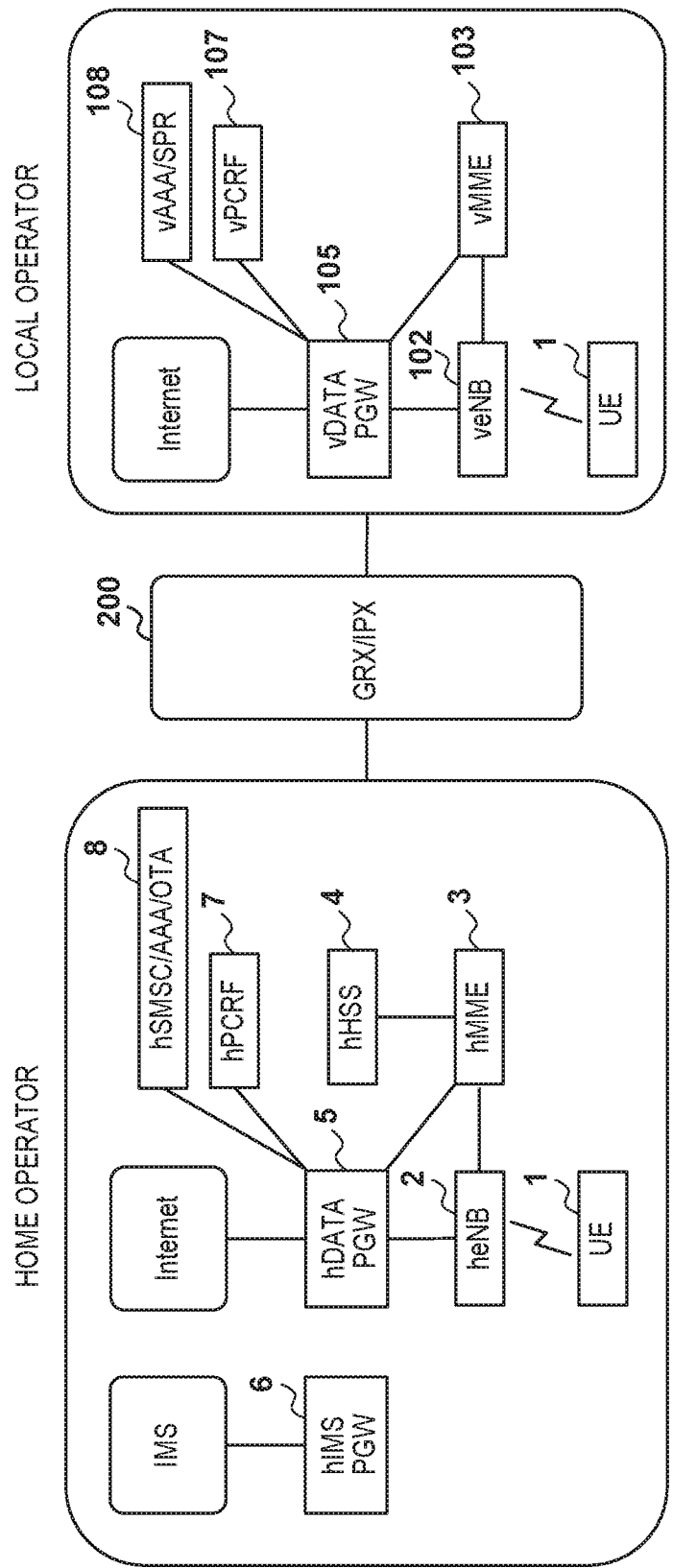
FIG. 1 is a diagram showing an example of a configuration of a communication system according to an embodiment.

FIG. 1 is a diagram showing an example of a configuration of a communication system according to the present embodiment. FIG. 1 shows devices included in a network of a home operator (hereinafter, referred to as the home network) of a portable terminal (UE) 1 and devices included in a network of a local operator (hereinafter, referred to as the roaming network). The home operator manages an heNB 2, an hMME 3, an hHSS 4, an hDATA_PGW 5, an hIMS_PGW 6, an hPCRF 7, and an hSMSC/AAA/OTA 8.

The local operator manages a veNB 102, a vMME 103, a vDATA_PGW 105, a vPCRF 107, and a vAAA/SPR 108. It should be noted that the first letter "h" of the names assigned to the components of the communication system indicates that these components belong to the home operator. Nate also that the first letter "v" of the names assigned to the components indicates that these components belong to the local operator. Moreover, it should be noted that, in the following description, the country in which the home operator provides services is different from the country in which the local operator provides services. Furthermore, note that "home" refers to the country in which the home operator provides the services and that "overseas" refers to the country different from the country in which the home operator provides the services.

The devices of the home operator are first described, The heNB 2 is a base station, such as an eNB in LTE, and transmits and receives data to and from the portable terminal 1 via a radio communication line. The hMME 3 is, for example, an MME (Mobility Management Entity) in LTE. The hMME 3 is a mobility management device that registers the location of the portable terminal 1, issues a call, and manages a handover or the like between base stations.

Based on a result of determining whether to connect the portable terminal 1 to an external network via the hDATA_PGW 5 or connect the portable terminal 1 to an external network via the vDATA_PGW 105, the hMME 3 can switch between causing the portable terminal 1 to use normal contract information for connection to the external network via the hDATA_PGW 5 and causing the portable terminal 1 to use temporary contract information for connection to the external network via the vDATA_PGW 105.

The hHSS 4 is a database in which user information including a phone number and a terminal identification number of the portable terminal 1 are managed. For example, the hHSS 4 is a contract information management device which manages an APN (Access Point Name) that is information on a contract between the user and the home operator. The hHSS 4 determines whether the user of the portable terminal 1 is at home or overseas. Upon determining that the user is overseas, the hHSS 4 transmits, to the vMME 103, a temporary APN which is temporary contract information used for connection to the external network by the local method.

The hDATA_PGW 5 (home DATA Packet Data Network Gateway) is a home gateway that allows the portable terminal 1 to transmit and receive data to and from the external network, such as the Internet, via the heNB 2. For example, the hDATA_PGW 5 assigns an IP address to the portable terminal 1, and performs user authentication when a bearer is established.

The hIMS_PGW 6 (home IP Multimedia Subsystem Packet Data Network Gateway) is a gateway connected to an IMS (IP Multimedia Subsystem). The hMME 3 can transmit and receive SMS (Short Message Service) messages via the hIMS_PGW 6.

The hPCRF 7 (home Policy and Charging Rule Function) is a server having a function of setting a policy, such as rules for priority control and charging based on services.

The hSMSC/AAA/OTA 8 (home Short Messaging Service Center/Authentication Authorization Accounting/Over the Air) is a server that determines, based on an action taken by the user of the portable terminal 1, whether to change the APN.

Next, the devices of the local operator are described. The veNB 102 is a base station corresponding to the heNB 2 of the home operator. The vMME 103 is a mobility management device corresponding to the hMME 3 of the home operator.

The vDATA_PGW 105 corresponds to the hDATA_PCW 5 of the home operator, and is a local gateway that allows the portable terminal 1 to transmit and receive data to and from the external network, such as the Internet, via the veNB 102. The vPCRF 107 corresponds to the hPCRF 7 of the home operator, and is a server having a charging function to function as a policy control device. Upon receiving a request from the vMME 103 to establish a channel to use the local method, the vPCRF 107 issues a policy for connection to the external network via the vDATA_PGW 105. The vAAA/SPR 108 functions as a policy management device that manages a policy of a temporary APN subscriber. The vAAA/SPR 108 stores the policy issued by the vPCRF 107 into a storage medium for management.

The devices managed by the home operator and the devices managed by the local operator can communicate with one another via a GRX/IPX 200 which is a relay network.

Overview of Communication Control Method

Figure 2:
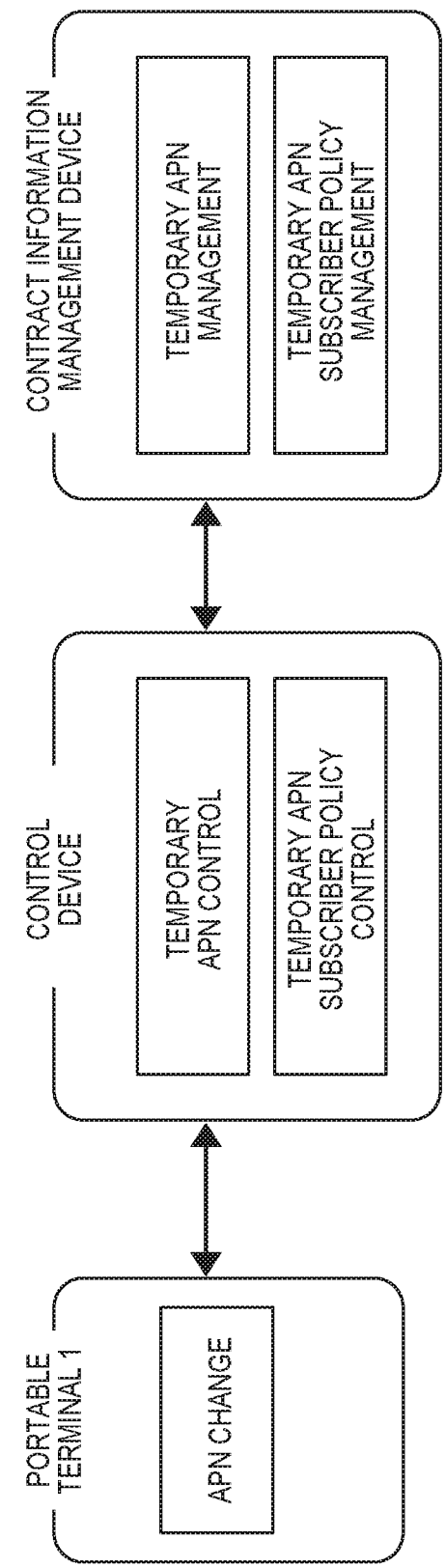
FIG. 2 is a diagram providing an overview of a communication control method according to an embodiment.

FIG. 2 is a diagram providing an overview of a communication control method according to the present embodiment. A feature of the portable terminal 1 according to the present embodiment is that it is possible to select between using the home method and using the local method, and that the APN is changed depending on the selected method. When the user of the portable terminal 1 performs an operation to change the APN to use the local method, the devices of the home operator and the devices of the local operator perform processing together to change the APN used by the portable terminal 1.

In the processing to change the APN, control devices (the hSMSC/AAA/OTA 8 and the vMME 103, for example) perform APN control and temporary APN subscriber policy control so that the user can temporarily receive the services from the local operator. Then, the user of the portable terminal 1 makes a contract with the local operator to receive the temporary communication services of the local operator. After the communication channel is established using the temporary APN, the user can perform contract processing online. This contract stipulates an allowed period of communication, an allowed amount of communication, and the like. After the user makes the contract, the local operator can charge and bill the user without involving the home operator.

After the completion of the contract, the contract information management device (the hHSS 4, for example) manages the temporary APN and the temporary APN subscriber policy. After the completion of the contract, the user can perform data communication using the local method until the expiration of the period stipulated in the contract or until the communication amount stipulated in the contract is consumed.

After this, when the contract between the user and the local operator expires, processing is executed to generate filter information in order for the data transmitted by the portable terminal 1 not to be sent out to the external network after the expiration of the contract. As a result, the portable terminal 1 of the user can no longer perform communication using the local method. After the expiration of the contract made by the user, the user can make a contract once again to restart communication using the local method. When the user returns home after the expiration of the contract, the network of the home operator performs processing to change the APN to enable communication in the environment of the home operator. Then, the portable terminal 1 can access the external network via the hDATA_PGW 5.

Configuration of Portable Terminal 1

Figure 3:
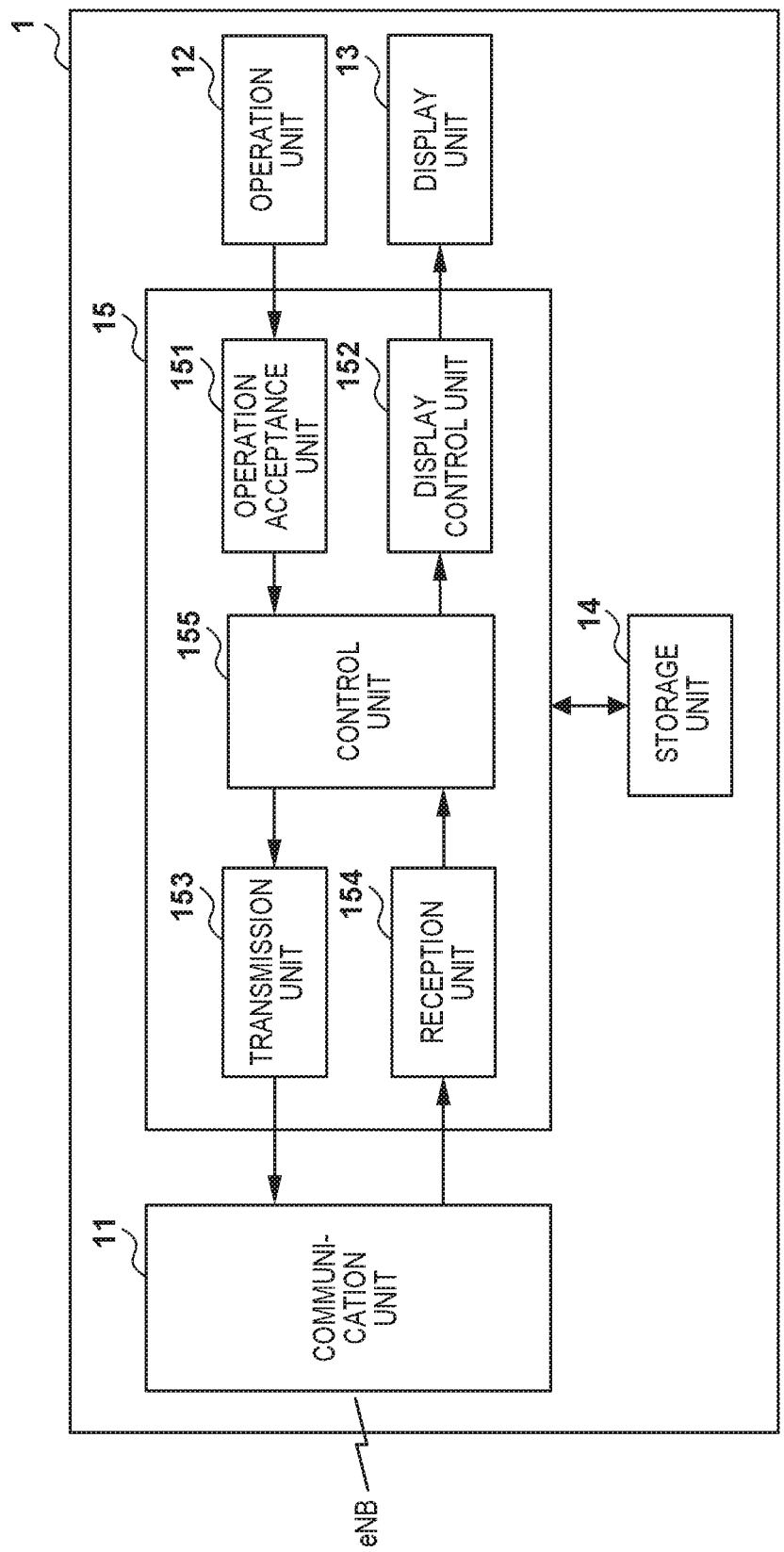
FIG. 3 is a diagram showing a configuration of a portable terminal according to an embodiment.

FIG. 3 is a diagram showing a configuration of the portable terminal 1. The portable terminal 1 includes a communication unit 11, an operation unit 12, a display unit 13, a storage unit 14, and a CPU 15. The CPU 15 includes an operation acceptance unit 151, a display control unit 152, a transmission unit 153, a reception unit 154, and a control unit 155.

The communication unit 11 is a radio communication unit, and transmits and receives radio waves to and from the heNB 2 or the veNB 102. The operation unit 12 is a device operated by the user, such as a touch panel. The display unit 13 is a device displaying information, such as a liquid crystal display.

The storage unit 14 is a storage medium that includes a ROM (Read Only Memory) and a RAM (Random Access Memory). The storage unit 14 stores programs to be executed by the CPU 15 (Central Processing Unit) and various kinds of data to be used in processing executed by the CPU 15.

The CPU 15 executes the programs stored in the storage unit 14 to function as the operation acceptance unit 151, the display control unit 152, the transmission control unit 153, the reception unit 154, and the control unit 155.

The operation acceptance unit 151 accepts an operation performed on the operation unit 12 by the user and notifies the control unit 155 of details of the operation. For example, the operation acceptance unit 151 accepts an operation in which a selection is made between using the home method for connection to the external network via the hDATA_PGW 5 and using the local method for connection to the external network via the vDATA_PGW 105. The operation acceptance unit 151 notifies the control unit 155 of selection information indicating the selected method. Under the control of the control unit 155, the display control unit 152 instructs the display unit 13 to display the information.

Under the control of the control unit 155, the transmission unit 153 transmits data via the communication unit 11. For example, the transmission unit 153 transmits, to the vMME 103, a method switching request including the selection information output from the operation acceptance unit 151.

The reception unit 154 receives data via the communication unit 11. For example, the reception unit 154 receives the temporary APN which is the temporary contract information used for connection to the external network using the local method. The reception unit 154 notifies the control unit 155 of the received temporary APN.

The control unit 155 determines the type of the APN which is the contract information used when the transmission unit 153 transmits the data. For the communication ander the environment of the home operator, the control unit 155 uses a home APN which is the normal contract information. For the communication under the environment of the local operator, the control unit 155 uses the temporary APN which is the temporary contract information provided when the temporary contract is made with the local operator. Upon receiving the notification of the temporary APN from the reception unit 154, the control unit 155 stores the temporary APN into the storage unit 14. Then, when data is to be transmitted, the control unit 155 reads out the temporary APN stored in the storage unit 14.

Configuration of vMME 103

Figure 4:
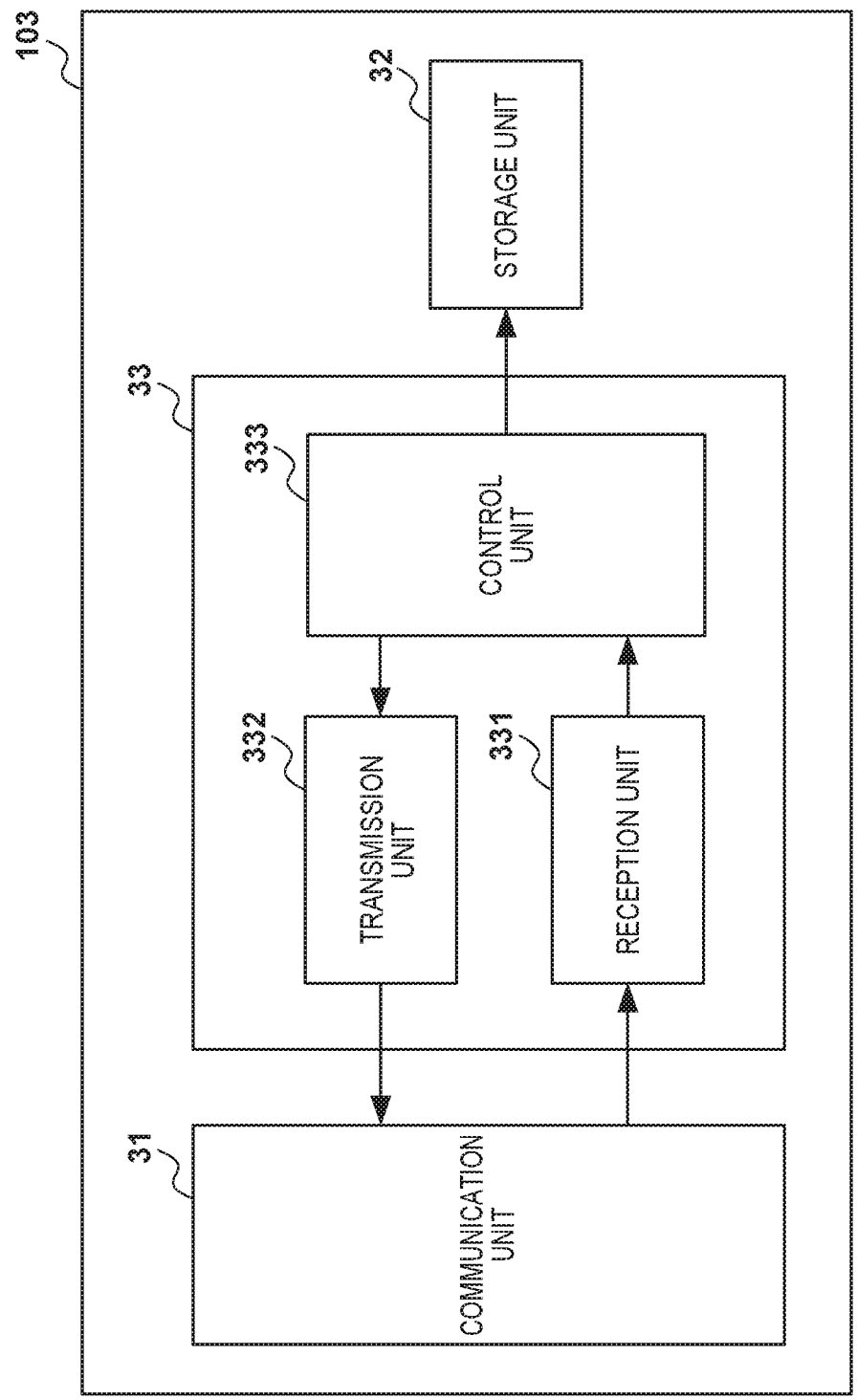
FIG. 4 is a diagram showing a configuration of a vMME according to an embodiment.

FIG. 4 is a diagram showing a configuration of the vMME 103. The vMME 103 includes a communication unit 31, a storage unit 32, and a CPU 33. The communication unit 31 is an interface for communicating with other devices, such as the heNB 2, the hUSS 4, and the hDATA_PGW 5.

The storage unit 32 is a storage medium that includes a ROM and a RAM. The storage unit 32 stores programs to be executed by the CPU 33 and various kinds of data to be used in processing executed by the CPU 33.

The CPU 33 executes the programs stored in the storage unit 32 to function as a reception unit 331, a transmission unit 332, and a control unit 333. The reception unit 331 receives, from the portable terminal 1, a method switching request including the selection information indicating whether the home method or the local method is selected. When the selection information in the method switching request received by the reception unit 331 indicates that the local method is to be used, the transmission unit 332 transmits, to the portable terminal 1, the temporary APN for connection to the external network using the local method.

Sequence to Change APN

Figure 5:
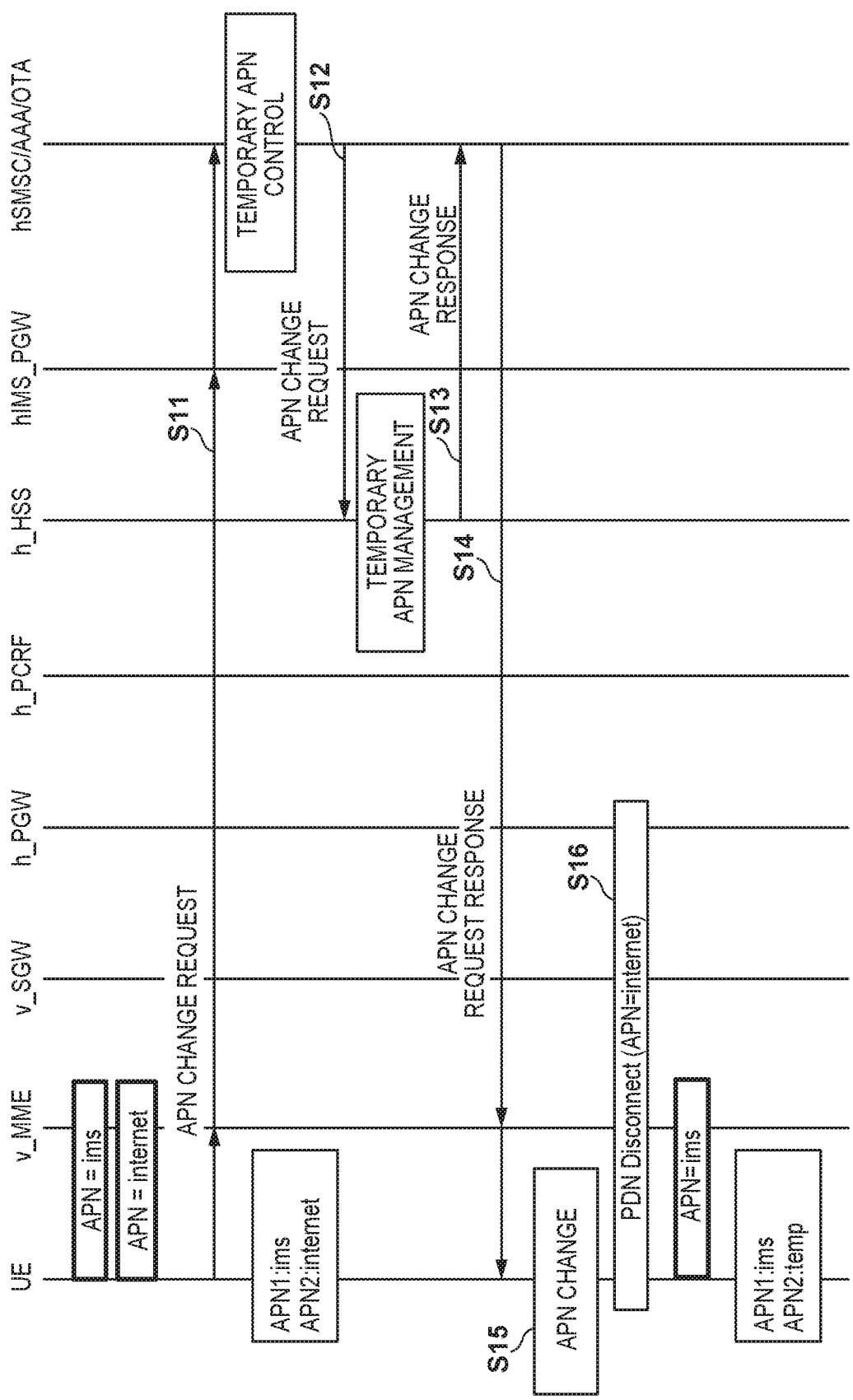
FIG. 5 is a sequence diagram showing steps to change an APN based on an operation performed by a user of a portable terminal according to an embodiment.

FIG. 5 is a communication sequence diagram showing steps to change the APN based on an operation performed by the user of the portable terminal 1. The communication sequence shown in FIG. 5 starts in the state where the APN for the home method is set. It should be noted that, in the diagrams described below, "APN=xxx" indicates the APN held by the portable terminal 1. For example, at the beginning in FIG. 5, the portable terminal 1 holds two APNs, one of which is "ims" used for connection to the IMS and the other of which is "internee" used for connection to the Internet. Note that the APN "internee" is used for connection to the Internet via the hDATA PGW 5.

When the user performs an operation to select the local method, the portable terminal 1 transmits, to the vMME 103, a short message including an APN change request message to change the APN that is the contract information, by including the short message in a Body part of an SIP message (S11). The vMME 103 transmits the received APN change request message to the hSMSC/AAA/OTA 8 via the GRXIIPX 200 and the hIMS_PGW 6. At this time, the portable terminal 1 transmits a message in which a predetermined phone number representing a request to change to the temporary APN is set in destination information of the SMS and in which a phone number (MSISDN) of the portable terminal 1 is set in source information. It should be noted that the portable terminal 1 may bypass the vMME 103 and transmit the short message to the hSMSCIAAA/ OTA 8.

Using a temporary APN control function, the hSMSC/ AAA/OTA 8 verifies the phone number of the destination information of the SMS included in the Body part of the received SIP message against a table stored in the hSMSC/ AAAIOTA 8 to be used for mapping the temporary APN. Then, the hSMSC/AAA/OTA 8 determines whether the phone number matches the temporary APN. If the phone number matches the temporary APN, the hSMSC/AAA/ OTA 8 transmits, to the hHSS 4, the APN change request message including the temporary APN corresponding to MSISDN and the phone number of the source information (S12). Here, the mapping table is a table in which the phone number of the portable terminal 1 is associated with a temporary APN for each country or each communication operator, for example. This mapping table is used to provide the temporary APN to the user requesting temporary connection to a specific country or communication operator. To be more specific, the phone number included in the destination information of the SMS indicates the local operator, and the mapping table shows a correspondence relationship between the MSISDN and phone number of the portable terminal 1 and the temporary APN for each phone number indicating a local operator. The portable terminal 1 includes, in the destination information of the SMS, the phone number indicating the local operator to which the portable terminal 1 requests for the temporary connection. With this, the hSMSC/AAA/OTA 8 determines the local operator to which the portable terminal 1 requests temporary connection, and further determines the temporary APN based on the MSISDN and phone number of the portable terminal 1.

Upon receiving the APN change request message, the hHSS 4 uses a temporary APN management function to determine whether the user corresponding to the MSISDN is allowed to have the received temporary APN. For example, the hHSS 4 can hold information on whether the user has subscribed to the temporary APN service, as a temporary APN subscriber attribute. Thus, based on this information, the hHSS 4 can determine whether the temporary APN is allowed. Moreover, the hHSS 4 can hold a list of allowed APNs, and thus can determine whether the temporary APN is allowed by determining whether the information on the APN included in the APN change request message matches information in the list. Upon determining that the temporary APN is allowed, the hHSS 4 transmits an APN change response message indicating the result of determination to the hSMSC/AAA/OTA 8 (S13).

Upon receiving the APN change response message, the hSMSC/AAA/OTA 8 transmits, to the vMME 103, an APN change request response message in which: a phone number representing APN change approval is set in the source information; the phone number of the portable terminal 1 is set in the destination information; and the temporary APN is set in the body (S14). The vMME 103 transfers the received APN change request response message to the portable terminal 1. In this way, when the selection information included in the method switching request received from the portable terminal 1 indicates that the local method is to be used, the vMME 103 receives, from the hSMSC/AAA/OTA 8, the temporary APN used for connection to the external network using the local method and then transmits the SMS including the received temporary APN in the body to the portable terminal 1.

Upon receiving the SMS, the portable terminal 1 uses an APN change function to store the temporary APN designated in the body of the received SMS into the storage unit 14 and change to the temporary APN (S15). It should be noted that this temporary APN is indicated as "temp" in FIG. 5. If the communication channel has been established using the pre-change APN, the portable terminal 1 performs processing to delete the setting of the communication channel (S16). Note that the steps described in FIG. 5 can be used to change the currently-used temporary APN back to the default APN.

Steps to Establish Communication Channel Using Temporary APN

Figure 6:
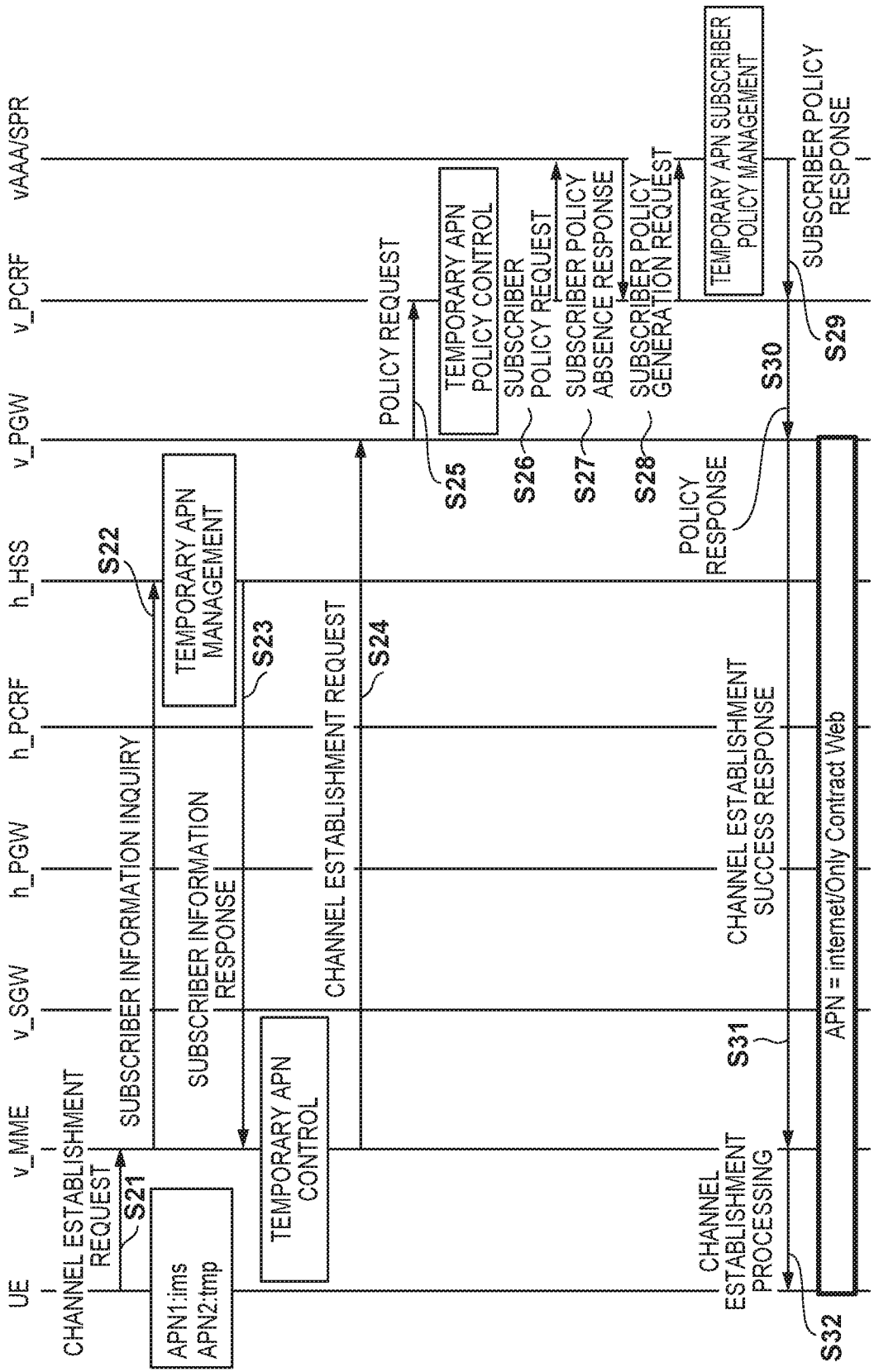
FIG. 6 is a sequence diagram showing steps to establish a communication channel using a temporary APN according to an embodiment.

FIG. 6 is a communication sequence diagram showing steps to establish a communication channel using the temporary APN. These steps are executed in an area of a roaming destination after the steps described in FIG. 5 are executed. These steps allow the portable terminal 1 to select the PGW for connection using the information on the APN to establish a communication channel.

To establish a communication channel, a channel establishment request (NAS-ECM: PDN Connectivity Request) including the temporary APN is transmitted to the vMME 103 (S21). The channel establishment request functions as a message requesting a contract from the local operator so that the vDATA_PGW 105 can be used for connection to the external network. It should be noted that this message may be included in an attach request (NAS-EMM: Attach Request) transmitted by the portable terminal 1 when the portable terminal 1 is turned on, or may be included in an S1AP message since the message is transmitted via the veNB 102. One of these messages includes UE identification information (such as IMSI and S1AP-ID).

Upon receiving the channel establishment request message, the vMME 103 identities the portable terminal 1 based on the UE identification information and transmits, to the hHSS 4, a subscriber information inquiry (S6a: ULR) including subscriber information (IMSI), area information (such as ECGI and TAI), and MME information (such as Origin-Host, Origin-realm, and PLMN-ID) (S22).

Upon receiving the subscriber information inquiry, the hHSS 4 uses the temporary APN management function to determine, for this subscriber, based on the area information or the MME information whether the user of the portable terminal 1 is overseas (roaming) or at home (non-roaming). Here, suppose that the user is determined as being overseas. Upon determining that the user of the portable terminal 1 is overseas, the hHSS 4 transmits a subscriber information response (S6a: ULA) including an overseas APN information list (including home APNs and temporary APNs) and the phone number (MSISDN) of the portable terminal 1 (S23). This subscriber information response may include the temporary APN subscriber attribute described above.

Here, if it is determined that the user of the portable terminal 1 is at home, the hHSS 4 transmits a subscriber information response including the home APN and the phone number of the portable terminal 1. Since the user is overseas in this example, the hHSS 4 stores visitor overseas network information indicating that the user of the portable terminal 1 is determined as being overseas. Here, suppose that Step S21 is not included in the attach request and that the subscriber information has already been obtained through execution of Steps S22 and S23 by a different attach request. In such a case, Steps S22 and S23 may be skipped.

Next, the vMME 103 uses the temporary APN control function to determine whether the temporary APN included in the channel establishment request is included in the APN information list received from the hHSS 4. If the temporary APN is included in the received APN information list, the vMME 103 determines that the temporary APN is allowed to be used. Moreover, the vMME 103 may make a determination regarding the temporary APN subscriber information based on the received temporary APN subscriber attribute. Upon determining that the user is a temporary APN service subscriber, the vMME 103 may determine, based on visitor area information of the user, that the temporary APN is allowed to be used. Then, the vMME 103 determines the type of the APN received from the portable terminal 1. If the APN received from the portable terminal 1 is the temporary APN, the vMME 103 determines the vDATA_PGW 105 as the PGW of a connection destination. If the temporary APN is not included in the APN information received from the hHSS 4, the vMME 103 determines that the temporary APN is not allowed to be used and that thus the home APN is to be used. More specifically, based on the result of comparing the contract information included in the channel establishment request and the temporary APN obtained from the hHSS 4, the vMME 103 determines whether to connect the portable terminal 1 to the external network via the hDATA_PGW 5 or connect the portable terminal 1 to the external network via the vDATA_PGW 105.

Upon determining the vDATA_PGW 105 as the PGW of the connection destination, the vMME 103 transmits a channel establishment request (GTPv2: Create Session Request) message including terminal identification information (IMSI and MSISDN) and the temporary APN to the vDATA_PGW 105 via a vSGW (S24).

Upon determining that the temporary APN is included in the received channel establishment request, the vDATA_PGW 105 transmits a policy request (Gx: CCR) including the temporary APN and the terminal identification information (IMSI and MSISDN) to the vPCRF 107 to generate charging information (S25). Upon determining, using a temporary APN subscriber policy control function, that the received policy request includes the temporary APN, the vPCRF 107 transmits a subscriber policy request to the vAAA/SPR 108 to obtain temporary subscriber policy information (S26).

Upon receiving the subscriber policy request, the vAAA/SPR 108 uses a temporary subscriber policy management function to determine whether the temporary subscriber policy information is present. Upon determining that the temporary subscriber policy information is not present, the vAAASPR 108 transmits a subscriber policy absence response indicating the absence of the subscriber policy information to the vPCRF 107 (S27). Upon receiving the subscriber absence response in Step S27, the vPCRF 107 uses the temporary APN subscriber policy control function to transmit, to the vAAA/SPR 108, a subscriber policy generation request to generate the temporary subscriber policy information (S28).

Upon receiving the subscriber policy generation request, the vAAA/SPR 108 uses the temporary subscriber policy management function to generate the temporary subscriber policy information that includes filter information TFT (Traffic Flow Template) having a destination restriction under which only the IP address of an online contract server is allowed. The vAAA/SPR 108 transmits, to the vPCRF 107, a subscriber policy response including a message to which the generated temporary APN subscriber policy information is added. Upon determining that the temporary subscriber policy information is present, the vAAA/SPR 108 transmits the temporary subscriber policy information to the vPCRF 107 that already exists, instead of generating the subscriber policy response including the message to which the temporary subscriber policy information is added (S29).

Upon receiving the subscriber policy response including the temporary subscriber policy information, the vPCRF 107 transmits a policy response (Gx: CCA) including the received temporary subscriber policy information to the vDATA_PGW 105 (S30). Upon receiving the policy response message, the VDATA_PGW 105 transmits a channel establishment success response (GTPv2: Create Session Response) including the policy information (such as the TFT) to the vMME 103 (S31). Upon receiving the channel establishment success response, the vMME 103 performs channel establishment processing with respect to the portable terminal 1 (S32).

Suppose that this channel is established for the first time. In this case, by setting the filter information TFT having the destination restriction as the policy information in Steps S28 and S29, the user of the portable terminal 1 can connect only to the contract server of the local operator. Suppose that Step 521 is executed after the user of the portable terminal 1 has made an online contract and the data communication has been fully started. Or more specifically, suppose that it is at least the second time that the channel establishment is requested. In this case, based on the filter information having no destination restriction, the user of the portable terminal 1 can perform data communication, such as making an Internet connection, according to the same steps, but excluding Steps S28 and S29.

Steps to Start Data Communication Through Online Contract

Figure 7:
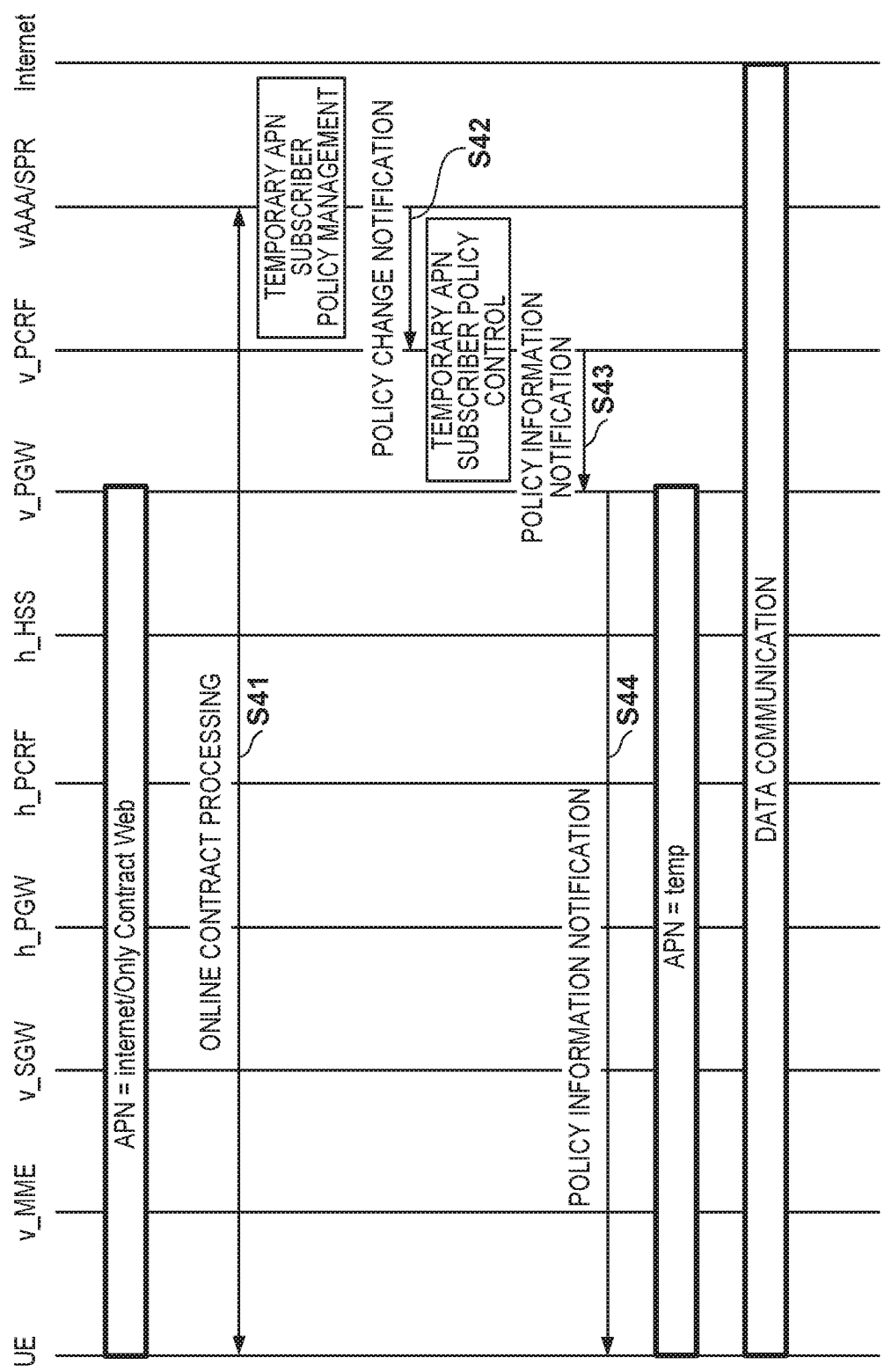
FIG. 7 is a sequence diagram showing steps to start data communication through an online contract according to an embodiment.

FIG. 7 is a communication sequence diagram showing steps to start data communication through an online contract. Through these steps to start data communication through an online contract, the portable terminal 1 can access the Internet. According to these steps, temporary subscriber information of the vAAA/SPR 108 is updated and Internet communication is started.

When the user opens a Web browser on the portable terminal 1, the portable terminal 1 displays a screen for making an online contract for accessing the Internet via the vDATA_PGW 105 managed by the local operator, by accessing the vAAA/SPR 108 as a contract server using HTTP by a channel that restricts access by the filter information TFT having the destination restriction (S41). It should be noted that APN="intemet/Only Contract Web" in FIG. 7 indicates that although a connection has been established using the APN "temp", connection to the external network is restricted by an IP filter function (TFT function) of the local operator. Here, the contract server requires user identification information. Thus, the entry of the phone number may be requested on the Web browser or the phone number may be included in an HTTP header. On the contact screen, information such as a contract period (one week, for example) and a contract amount (1 GB, for example) can be entered.

The vAAA/SPR 108 uses the temporary subscriber policy management function to verify the user identification information against the held temporary subscriber policy information and determine whether the temporary subscriber policy information has been generated. If the temporary subscribe policy information has been generated, the vAAA/SPR 108 updates the temporary subscriber policy information based on a communication contract requested by the user. Here, the vAAA/SPR 108 deletes a destination restriction condition from the filter information TFT having the destination restriction.

The vAAA'SPR 108 transmits, to the vPCRF 107, a change notification that includes the temporary subscriber policy information including the updated filter information TFT (S42). Upon receiving the change notification, the vPCRF 107 transmits the temporary subscriber policy information to the vDATA_PGW 105 (S43). The vPCRF 107 notifies the portable terminal 1 that the policy information has been updated (S44). Then, the portable terminal 1 can start the Intenet communication without access restriction, based on the updated filter information. In this way, upon receiving the channel establishment request including the temporary APN from the portable terminal 1 after causing the contract screen to be displayed on the portable terminal 1 and then accepting the contract operation, the vDATA_PGW 105 allows the portable terminal 1 to access the external network via the vDATA_PGW 105.

Steps to Generate Filter Information at Expiration of Contract

Figure 8:
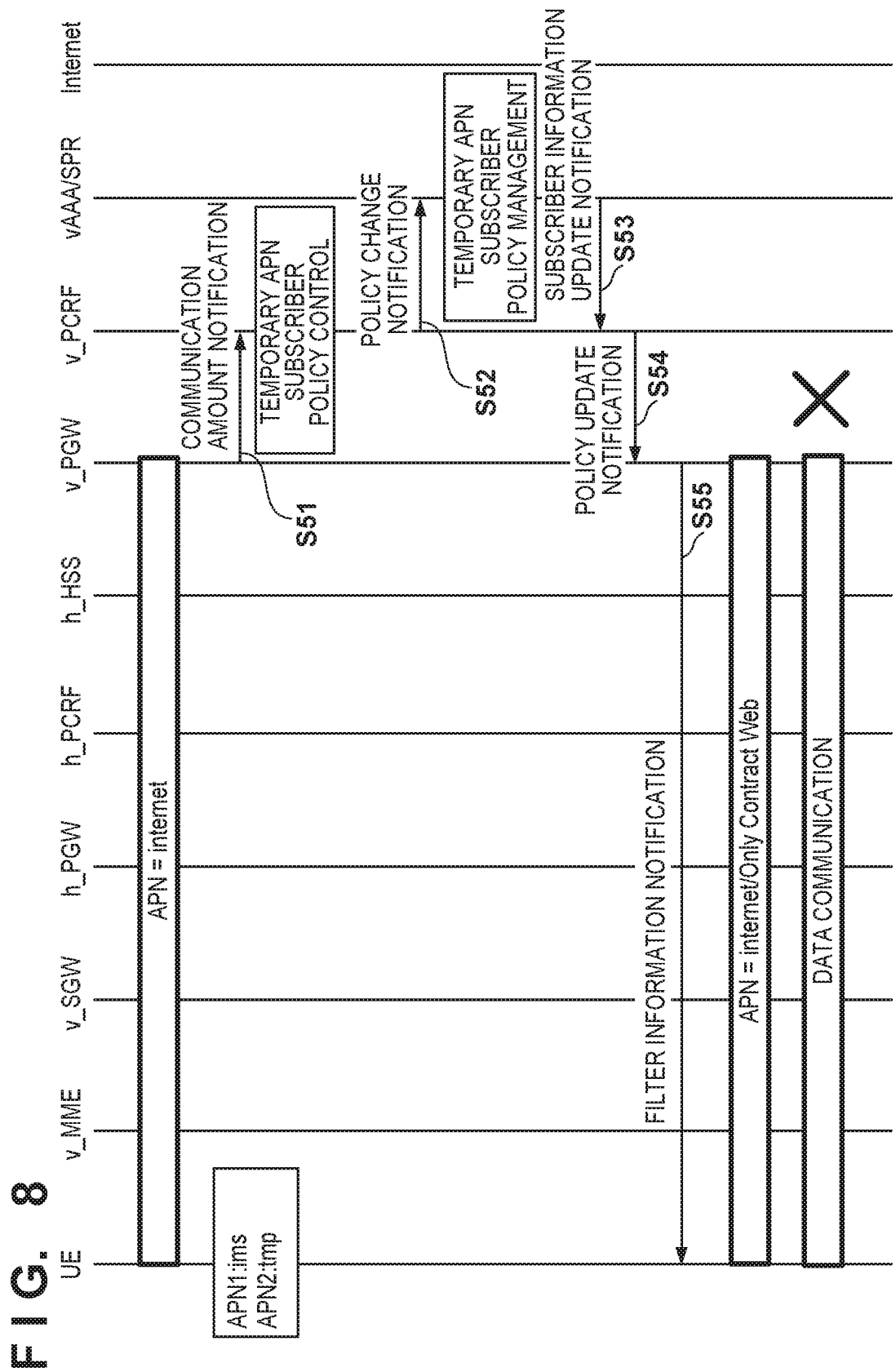
FIG. 8 is a sequence diagram showing steps to generate filter information when a contract period is expired, according to an embodiment.

FIG. 8 is a communication sequence diagram showing steps to generate the filter information when the contract period is expired. For example, suppose that the portable terminal 1 uses up the allowed amount of communication. In this case, the local operator follows the filter information generation steps at the expiration of the contract period to block the portable terminal 1 from connecting to the Internet. To do so, the local operator filters the data communication performed by the portable terminal 1 to access the Internet.

The VDATA_PGW 105 counts the amount of data communication performed via, for example, the Internet. When the counted amount exceeds the allowed amount of communication, the vDATA_PGW 105 transmits a message to notify the vPCRF 107 that the communication amount of the portable terminal 1 has exceeded the allowed amount of communication (S51). Upon receiving the message indicating the exceedance of the communication amount, the vPCRF 107 uses the temporary APN subscriber policy control function to notify the vAAA/SPR 108 that the policy is to be changed due to the exceedance of the data communication amount (S52).

Upon receiving the notification of the exceedance of the data communication amount, the vAAA/SPR 108 uses the temporary APN subscriber policy management function to update the temporary APN subscriber policy information that includes the filter information TFT having the destination restriction and transmit a subscriber information update notification message including the updated temporary APN subscriber policy information to the vPCRF 107 (S53).

The vPCRF 107 transmits, to the vDATA_PGW 105, a policy update notification including the temporary APN subscriber policy information included in the subscriber information update notification (S54). The vDATA_PGW 105 transmits, to the portable terminal 1, the policy information that is received in the policy update notification and includes the filter information ITT having the destination restriction. By updating the filter information to the received filter information TFT, the portable terminal 1 is allowed to connect only to the contract server of the local operator and restricted from other communications by the vDATA_PGW 105.

Steps to Return to Home Method

Figure 9:
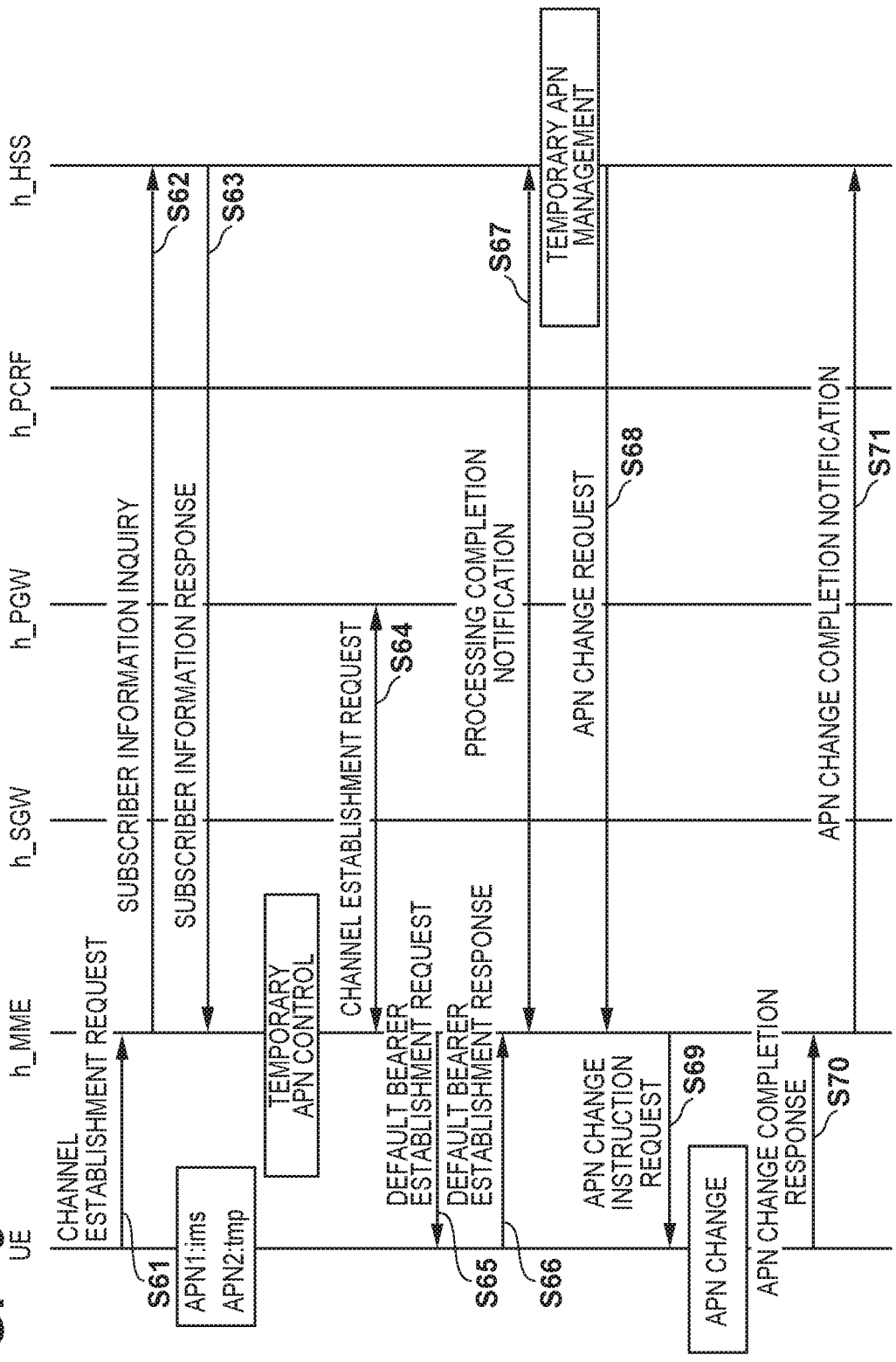
FIG. 9 is a sequence diagram showing steps to return the method of accessing an external network back to the home method, according to an embodiment.

FIG. 9 is a communication sequence diagram showing steps to return the method of accessing the external network back to the home method. Through these steps, the temporary APN used when the method is changed to the local method is returned back to the original APN. Thus, when the user returns home from overseas, a channel to access the Internet via the hDATA_PGW 5, which is the home PGW, can be automatically established.

To establish the communication channel, the portable terminal 1 transmits, to the hMME 3, a channel establishment request message (NAS-ECM: PDN Connectivity Request) including the temporary APN (S61). It should be noted that this message may be included in an attach request (NAS-EMM: Attach Request) transmitted by the portable terminal 1 when the portable terminal is turned on or may be included in a S1AP message since the message is transmitted via the portable terminal 1. One of these messages includes the UE identification information (such as IMSI and S1AP-ID).

Upon receiving the channel establishment request message, the hMME 3 identifies the portable terminal 1 based on the UE identification information and transmits, to the hHSS 4, a subscriber information inquiry (S6a: ULR) including the subscriber information (IMSI), the area information (such as ECGI and TAI), and the MME information (such as Origin-Host, Origin-realm, and PLMN-ID) (S62).

Upon receiving the subscriber information inquiry, the hHSS 4 uses the temporary APN management function to determine, based on the area information or the MME information, whether the user of the portable terminal 1 is overseas (roaming) or at home (non-roaming). Since the user is at home, the hHSS 4 transmits a subscriber information response including the home APN and the phone number of the portable terminal 1 (S63). Here, suppose that Step S61 is not included in the attach request and that the subscriber information has already been obtained through execution of Steps S62 and S63 by a different attach request. In such a case, Steps S62 and S63 can be skipped.

The hMME 3 uses the temporary APN control function to determine whether the temporary APN is included in the APN information received from the hHSS 4. Here, the temporary APN is not included in the APN information received from the hSS 4. When the temporary APN is not included, the hMME 3 determines that the temporary APN is not allowed to be used and establishes the channel using the home APN instead of the temporary APN set in the portable terminal 1. Moreover, the hMME 103 may make a determination regarding the temporary APN subscriber information based on the received temporary APN subscriber attribute. Then, the hMME 103 may determine that the temporary APN is not allowed to be used, based on the fact that the user is not a subscriber of the temporary APN service, or based on the fact that the user is a subscriber of the temporary APN service and on, for example, the PLM-NID included in the visitor area information of the user. To be more specific, the hMME 3 transmits and receives the channel establishment request (GTPv2: Create Session Request/Response) messages to and from the hDATA_PGW 5 using the home APN (S64).

The hMME 3 performs processing to transmit, to the portable terminal 1, a default bearer establishment request using the policy information of the home APN (S65). The portable terminal 1 receives the default bearer establishment processing request for the APN different from the APN that was requested in the channel establishment request message. However, the portable terminal 1 prioritizes the instruction from the hMME 3 and continues the processing. Thus, the portable terminal 1 transmits the default bearer establishment to the hMME to complete the default bearer establishment and then transmits a default bearer establishment response to the hMME 3 (S66). After the completion of the default bearer establishment, the hMME 3 transmits a processing completion notification (S6a: Notify Request/Answer) to the hHSS 4 (S67).

Upon determining, using the temporary APN management function, that the portable terminal 1 has been used overseas after the change of the temporary APN, the hHSS 4 transmits an APN change request (S6a: IDR) including the home APN to the hMME 3 (S68). Upon determining that the portable terminal 1 has not been used after the change of the temporary APN, the hHSS 4 does not transmit the APN change request to the hMME 3. The hHSS 4 can determine whether the user has been overseas after the change of the temporary APN by reference to, for example, the visitor overseas network information.

Upon receiving the APN change request, the hMME 3 uses the temporary APN control function to transmit an APN change instruction request to the portable terminal 1 (S69). Here, a NAS (Non-Access Stratum) signal sent from the hMME 3 is suitable for the APN change instruction request signal, and a NAS-ECM information request can be used for example.

Upon receiving the APN change instruction request, the portable terminal 1 uses the APN change function to change the APN and transmit an APN change completion response to the hMME 3 (S70), Upon receiving the APN change completion response, the hMME 3 transmits an APN change completion notification to the hHSS 4 (S71).

In this way, upon receiving the channel establishment request including the temporary APN from the portable terminal 1, the hMME 3 instructs the portable terminal 1 to switch the contract information to the home APN (i.e., switch to "internet") for connection to the external network using the home method. As a result, when the user returns home, the portable terminal 1 can automatically access the Internet via the hDATA_PGW 5.

Variation 1

Figure 10:
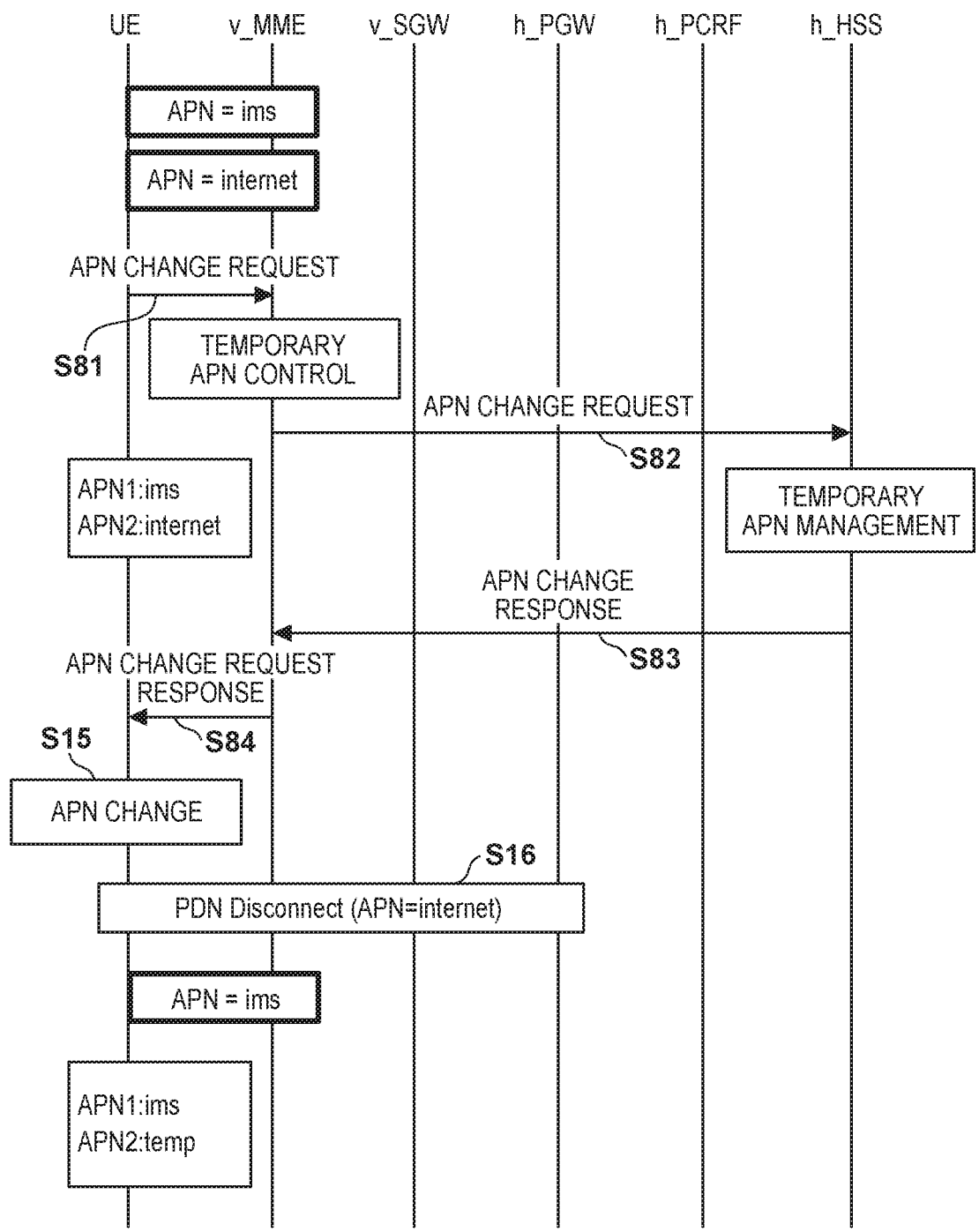
FIG. 10 is a sequence diagram showing a variation of the steps shown in FIG. 5, according to an embodiment.

FIG. 10 is a communication sequence diagram showing a variation of the steps shown in FIG. 5. Step S81 in FIG. 10 is the same as Step S11 in FIG. 5. After this step, in the communication sequence in FIG. 10, the vMME 103 that received the APN change request transmits the APN change request to the hHSS 4 instead of to the hSMSC/AAA/OTA 8 (S82). Then, the hHSS 4 transmits the APN change response to the vMME 103 (S83), and the vMME 103 transmits the APN change request response to the portable terminal 1 (S84). In this way, the vMME 103 may take the initiative to execute the temporary APN control.

Variation 2

In the above description, an example of the configuration in which the vMME 103 functions as the mobility management device to transmit the temporary APN to the portable terminal 1 has been explained. However, a device other than the vMME 103 may function as the mobility management device to transmit the temporary APN to the portable terminal 1. Moreover, the mobility management device does not need to be configured by a single device, and a plurality of devices may operate together to function as the mobility management device. For example, the hSMSC/AAA/OTA 8 may bypass the vMME 103 to transmit the temporary AVN directly to the portable terminal 1.

Effect of Present Embodiment

According to the present embodiment as described thus far, the portable terminal 1 can easily switch between the home route method and the local breakout method for roaming without replacing the SIM or changing the phone number. The user of the portable terminal 1 can select the channel at their own discretion during roaming. Thus, the communication operator can provide a service that meets the needs of the user.

Second Embodiment

According to First Embodiment, the APN used by the portable terminal 1 is switched for roaming between the operators. To be more specific, the DATA PGW to be connected to the portable terminal 1 is switched among the different operators. In the present embodiment, the DATA PGW is switched within the same operator.

Figure 11:
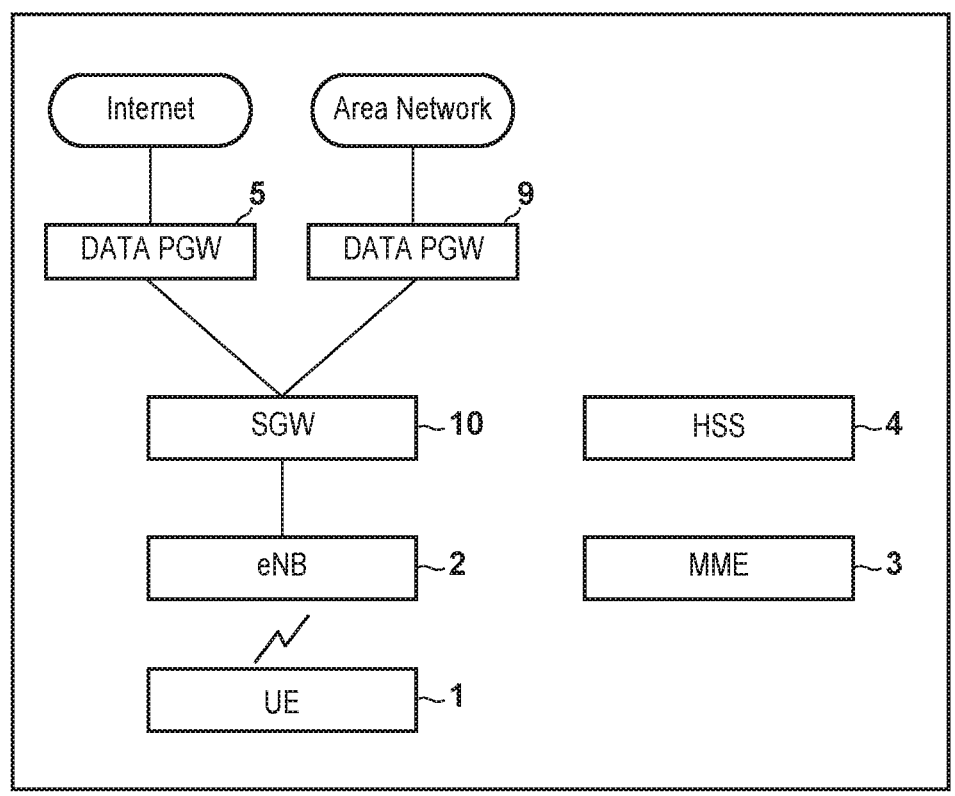
FIG. 11 is a diagram showing an example of a configuration of a communication system according to an embodiment.

FIG. 11 is a diagram showing a configuration of the home operator of the portable terminal 1. It should be noted that since the local operator is irrelevant to the present embodiment, each of the devices is shown without the first letter "h" that is shown in FIG. 1. However, note that the same components as those in FIG. 1 are assigned the same reference signs as used in FIG. 1. Moreover, to simplify the diagram, devices that are in the home operator shown in FIG. 1 but unnecessary in the description of the present embodiment are omitted, and lines for indicating the obvious relation of connection are also omitted. For example, an HSS 4 and an MME 3 can communicate with an eNB 2, an SGW 10, and DATA PGWs 5 and 9. Here, the SGW 10 is a serving gateway and relays signals between the eNB2 and each of the DATA PGWs 5 and 9. This device is omitted in FIG. 1 to simplify the diagram. The DATA PGW 5 corresponds to the hDATA PGW 5 in FIG. 1 and is, for example, a gateway used for connection to the Internet. The DATA PGW 9 is a gateway for connection to an area network. Note that the area network may be a network that connects to the Internet or a closed network that does not connect to the Internet.

The area network is associated with a geographical area. In the present embodiment, the geographical area is referred to as the tracking area. In other words, the area network is associated with the tracking area. In the present embodiment, the HSS 4 holds information on whether the portable terminal 1 has a right to access the area network. For example, the portable terminal 1 is granted the right to access the area network through a contract with the home operator. If the portable terminal 1 has the right to access the area network, the MME 3 holds an APN ("temp" in this case) to connect the portable terminal 1 to the DATA PGW 9 in association the portable terminal 1, in addition to holding an APN ("internee" in this case) to connect the portable terminal 1 to the DATA PGW 5. Moreover, the MME 3 holds information on the area network and on the tracking area associated with this area network.

Figure 12:
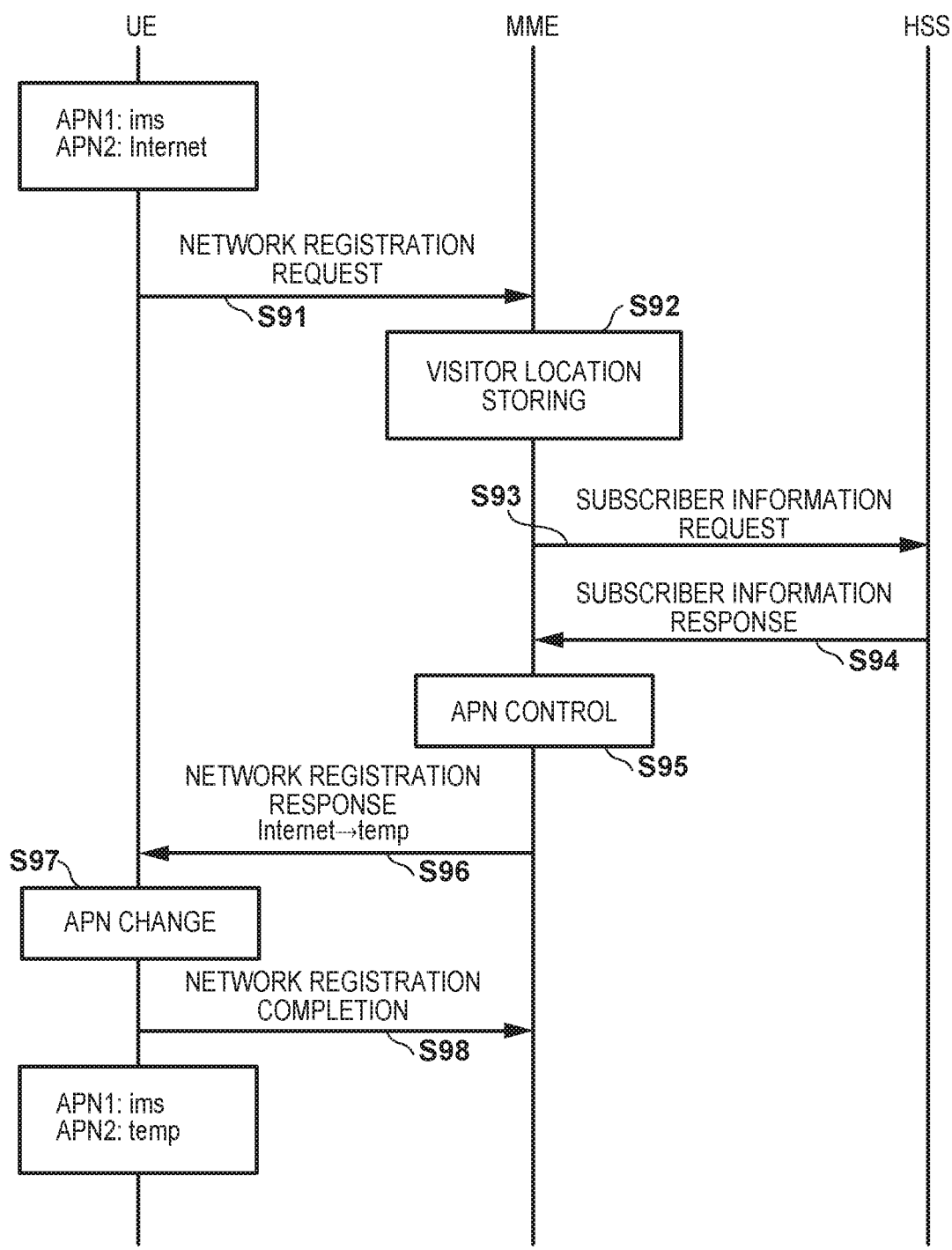
FIG. 12 is a sequence diagram showing steps to change the APN according to an embodiment.

FIG. 12 is a sequence diagram showing APN switching according to the present embodiment. In S91, the portable terminal 1 transmits, to the MME 3, a network registration request message to register a visitor area. The network registration request message in S91 can possibly be an S1AP message or an attach request (NAS-EMM: Attach Request) transmitted by the portable terminal 1 triggered by power-on. It should be noted that the network registration request message includes UE identification information (such as IMSI and S1AP-ID) and visitor area information (such as ECGI and TAI). In S92, the MME identifies the portable terminal 1 based on the UE identification information and stores the visitor area information of the portable terminal 1. After this, the MME 3 transmits a subscriber information request message to the HSS 4 in S93. The subscriber information request message includes a subscriber identifier (such as IMSI and MSISDN), the visitor area information, and MME information (such as Origin-Host, Origin-realm, and PLMN-ID).

Upon receiving the subscriber information request message, the HSS 4 identities the portable terminal 1 based on the subscriber identifier. Then, the HSS 4 transmits a subscriber information response (S6a: ULA) in S94. This subscriber information response includes the information on whether the portable terminal has the right to access the area network. Upon receiving the subscriber information response, the MME 3 performs APN control in S95. The MME 3 first determines, based on the subscribe information response, whether the portable terminal 1 has the right to access the area network. Suppose here that the portable terminal 1 has the right to access the area network. In this case, the MME 3 determines whether the portable terminal is currently in the tracking area associated with the area network. Suppose here that the portable terminal is currently in the tracking area associated with the area network. In this case, the MME 3 transmits a network registration response (NAS-EMM: Attach Accept) to the portable terminal 1 in S96. In this response, the MME 3 instructs the portable terminal 1 to switch the APN "internet" used for connection to the DATA PGW 5 to the APN "temp" used for connection to the DATA PGW 9, In accordance with the network registration response, the portable terminal 1 performs APN switching to change the APN in S97. After this, the portable terminal 1 transmits a network registration completion (NAS-EMM: Attach Complete) to the MME 3 in S98.

As a result, the portable terminal 1 is connected to the area network using the APN "temp" via the DATA PGW 9. For example, the portable terminal 1 can perform low-latency data transfer with the area network using the tracking area associated with the area network as an area that includes the installation position of the DATA PGW 9. It should be noted that when the portable terminal 1 is moved to the outside of the tracking area associated with the area network, the MME 3 instructs the portable terminal 1 to switch the APN from "temp" to "internet" as in S96.

Instead of the network registration request (S91) and the network registration response (S96), processes corresponding to S91 and S96 in FIG. 11 can be performed according to NAS signal steps. For example, a tracking area update (Tracking Area Update) can be used in S91, and a tracking area update response (Tracking Area Update Accept) can be used in S96. Moreover, NAS-ESM information request/response can also be used. Furthermore, although the area network is associated with the tracking area in the present embodiment, a different method can be used to set and identify a geological area (Area) that is to be associated with the area network, such as an area identified by at least one cell.

In the present embodiment, only one area network is used to simplify the description. However, it is typical for the core network of the home operator to be connected to a plurality of area networks. In this case, the HSS 4 holds information, for each of the portable terminals 1, on an area network which the portable terminal 1 has the right to access. Moreover, in this case, the DATA PGW 9 is provided for each of the area networks. Thus, the MME 3 holds information on the DATA PGW 9 for each of the area networks and on the area (such as the tracking area) associated for each of the area networks. Furthermore, the MME 3 holds information on the APN used when the portable terminal 1 is connected to the DATA PGW 9 corresponding to the area network which the portable terminal 1 has the right to access.

Then, in S94, the HSS 4 includes, in the subscriber information response, information indicating the area network which the portable terminal 1 has the right to access. If the portable terminal 1 is located in the area associated with the area network which the portable terminal 1 has the right to access, the MME 3 instructs the portable terminal 1 to switch to the APN used for connection to the DATA PGW 9 associated with this area network in S96.

Moreover, the MME 3 can also hold a corresponding application for each of the APNs of the portable terminal 1. In S96, it is also possible to designate an application that is to use the post-switch APN. In this case, when the designated application is running, the portable terminal 1 can perform communication using the APN designated as the switching destination in S96. On the other hand, when running an application that was not designated in S96 from among the applications corresponding to the pre-switch APN, the portable terminal 1 can perform communication using the pre-switch APN.

It should be noted that the present embodiment is also applicable in the case where, for example, the MME 3 and the DATA PGW 5 are the devices managed by the home operator and the DATA PGW 9 is a device managed by a different communication operator at home or a virtual communication operator (so-called MVNO [Mobile Virtual Network Operator]). In this case, even without changing the subscriber contract made with one communication operator, the user can make a temporary contract with a different communication operator for only a specific communication service. This enhances the flexibility of the communication service provided by the communication operator.

In FIG. 11 and FIG. 12, the devices are described using the terms used for a 4G system. However, the present invention is not limited to the 4G system and is of course applicable to a 5G system. In the case of the 5G system, the eNB 2 in FIG. 11 corresponds to a 5G RAN, and the HSS 4 in FIG. 11 corresponds to UDM (Unified Data Management). The MME 3 in FIG. 11 corresponds to MM (Mobility Management) and SM (Session Management) included in a CPF (C-Plane Function) The SGW 10 and DATA PGWs 5 and 9 in FIG. 11 correspond to SM (Session Management) and a IMF (U-Plane Function) included in the CPF. Moreover, the parameter corresponding to the 4G APN corresponds to a DNN (Data Network Name) in the 5G system.

Although the present invention has been described by way of embodiments, the technical scope of the present invention is not limited to the scope described in the above embodiments. It should be obvious to those skilled in the art that various changes or improvements can be made to the above embodiments. In particular, detailed distribution and integration implemented in devices are not limited to those illustrated in the accompanying drawings described above. Some or all of the devices can be functionally or physically distributed and integrated in arbitrary units depending on various additions or the like or on functional load.

The present invention is not limited to the above embodiments and various changes and modifications can be made within the spirit and scope of the present invention. Therefore, to apprise the public of the scope of the present invention, the following claims are made.

The invention claimed is:

1. A communication system comprising: a portable terminal; a mobility management device that manages mobility of the portable terminal; a first gateway that connects the portable terminal to a first network; and a second gateway that connects the portable terminal to a second network,
wherein the mobility management device determines whether to connect the portable terminal to the first network via the first gateway or connect the portable terminal to the second network via the second gateway based on a location of the portable terminal, transmits first contract information to the portable terminal to cause the portable terminal to use the first contract information for connection to the first network via the first gateway in case of determining to connect the portable terminal to the first network, and transmits second contract information to the portable terminal to cause the portable terminal to use the second contract information for connection to the second network via the second gateway in case of determining to connect the portable terminal to the second network.

2. The communication system according to claim 1,
wherein the second network is associated with a geographical area, and
the mobility management device requires that the location of the portable terminal is in the geographical area, as a condition for determining to connect the portable terminal to the second network via the second gateway.

3. The communication system according to claim 1,
wherein the mobility management device requires the portable terminal to have a right to access the second network, as a condition for determining to connect the portable terminal to the second network via the second gateway.

4. The communication system according to claim 1,
wherein the mobility management device designates an application that is to be used in communication performed by the portable terminal when the portable terminal is connected to the second network via the second gateway.

5. The communication system according to claim 1,
wherein the first gateway and the second gateway are devices of a home network of the portable terminal.

6. The communication system according to claim 1,
wherein the first gateway is a device of a home network of the portable terminal, and
the second gateway is a device of a roaming network different from the home network of the portable terminal.

7. The communication system according to claim 6,
wherein the first network and the second network are the same external network that connects to both the first gateway and the second gateway.

8. A mobility management device that manages mobility of a portable terminal, the mobility management device comprising:
a determination unit configured to determine whether to connect the portable terminal to a first network via a first gateway connected to the first network or to connect the portable terminal to a second network via a second gateway connected to the second network based on a location of the portable terminal; and
a transmitting unit configured to transmit first contract information to the portable terminal to cause the portable terminal to use the first contract information for connection to the first network via the first gateway in case that the determination unit determines to connect the portable terminal to the first network, and transmit second contract information to the portable terminal to cause the portable terminal to use the second contract information for connection to the second network via the second gateway in case that the determination means determines to connect the portable terminal to the second network.

* * * * *